United States Patent
Ohashi et al.

(10) Patent No.: US 7,182,999 B2
(45) Date of Patent: Feb. 27, 2007

(54) INORGANIC STAPLE FIBER ACCUMULATION FOR HOLDING MATERIAL, PROCESS FOR PRODUCING THE SAME AND HOLDING MATERIAL

(75) Inventors: Hiroyuki Ohashi, Niigata (JP); Tomoo Saito, Niigata (JP); Koichi Fuji, Niigata (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 242 days.

(21) Appl. No.: 10/517,618

(22) PCT Filed: Jun. 26, 2003

(86) PCT No.: PCT/JP03/08135

§ 371 (c)(1),
(2), (4) Date: Dec. 23, 2004

(87) PCT Pub. No.: WO2004/003276

PCT Pub. Date: Jan. 8, 2004

(65) Prior Publication Data

US 2005/0227058 A1 Oct. 13, 2005

(30) Foreign Application Priority Data

Jun. 28, 2002 (JP) .............................. 2002-190348

(51) Int. Cl.
*D04H 1/00* (2006.01)
*B32B 3/02* (2006.01)
(52) U.S. Cl. .................................... 428/292.1; 428/116
(58) Field of Classification Search ............. 428/292.1, 428/116; 501/95.2; 264/628; 55/524
See application file for complete search history.

(56) References Cited

FOREIGN PATENT DOCUMENTS

| JP | 60-88162 | 5/1985 |
|---|---|---|
| JP | 61-194132 | 8/1986 |
| JP | 62-139841 | 6/1987 |
| JP | 62-231019 | 10/1987 |
| JP | 7-286514 | 10/1995 |
| JP | 11-82006 | 3/1999 |
| JP | 2002-506166 | 2/2002 |
| WO | 02/33233 | 4/2002 |

*Primary Examiner*—N. Edwards
(74) *Attorney, Agent, or Firm*—Oblon, Spivak, McClelland, Maier & Neustadt, P.C.

(57) ABSTRACT

An aggregate with small fiber deterioration even after being held under compression under heating at about 1,000° C. for a long term, and a holding material of e.g. a catalyst carrier of a catalyst converter or a honeycomb body of DPE employing it, are provided. An inorganic short fiber aggregate for a holding material, which is an aggregate of inorganic short fibers having a chemical composition of from 74 to 86 mass % of an alumina component and from 26 to 14 mass % of a silica component and having a mineral composition of from 15 to 60 mass % of mullite, wherein the average fiber diameter of the aggregate is from 2 to 8 μm, at least 99% (including 100%) of the number of the inorganic short fibers consists of fibers having fiber diameters of from 1.5 to 15 μm, and the specific surface area is at most 10 m$^2$/g. Its production process, and a holding material consisting of a sheet-shape formed product comprising the aggregate and an organic binder contained in the aggregate, wherein inorganic short fibers are employed.

7 Claims, No Drawings

INORGANIC STAPLE FIBER ACCUMULATION FOR HOLDING MATERIAL, PROCESS FOR PRODUCING THE SAME AND HOLDING MATERIAL

TECHNICAL FIELD

The present invention relates to an inorganic short fiber aggregate for a holding material, its production process and a holding material. The holding material which is an object of the present invention may, for example, be a holding material for fixing a catalyst carrier for an automotive exhaust gas clarifying catalyst converter (hereinafter referred to as a catalyst converter) and a holding material for fixing a honeycomb body for a diesel particulate filter (hereinafter referred to as DPF), and further, a joint filler for a high temperature refractory.

BACKGROUND ART

Heretofore, a catalyst converter has been used to detoxify harmful components such as CO and NOx contained in an exhaust gas from an internal combustion engine. As the structure of the catalyst converter, a holding material is disposed between a catalyst carrier and a metal shell which covers the exterior of the catalyst carrier, and the role of the holding material is prevention of breakage of the catalyst carrier due to e.g. vibration, prevention of leakage of the exhaust gas, etc. (JP-A-11-82006). As the holding material, an alumina fiber laminate is becoming used widely with a view to dealing with the increase in the temperature of the exhaust gas to improve the rate of fuel consumption and in view of the stability during long term use, etc. (JP-A-7-286514)

In recent years, the temperature of the exhaust gas becomes increasingly high, and in DPF which is becoming used practically, collected particulates have to be destroyed by fire at a temperature of about 1,000° C. Accordingly, a holding material is required to have durability at a high temperature more than ever before. In addition, durability against wind erosion due to the exhaust gas is also required.

On the other hand, the heat resistance temperature of alumina fibers is considered to be from about 1,300 to about 1,700° C. in view of e.g. the shrinkage ratio of the fibers under heating, and it is considered that they are sufficiently practicable for use in an atmosphere of about 1,000° C. However, the present inventors have found that deterioration of fibers which is considered to be attributable to e.g. fatigue failure or creep remarkably proceeds more than expected, in a case where a compressive force is applied under heating at about 1,000° C. for a long term, such as a case of a holding material for DPF. Accordingly, even when no abnormality is confirmed externally, the restoring force (repulsive force) may be lowered due to subtle deterioration of the holding material, and accordingly e.g. a honeycomb may not be held with a sufficient repulsive force, and the exhaust gas may leak from that area. Further, due to exposure of the holding material to an exhaust gas for a long term, the holding material may be gradually eroded by wind, thus causing a gap between e.g. a honeycomb and the holding material, whereby the exhaust gas may leak or e.g. the honeycomb may slip down.

Under these circumstances, it is an object of the present invention to provide a holding material with small fiber deterioration and excellent in wind erosion resistance, even when a compressive force is applied under heating at about 1,000° C. for a long term.

Another object of the present invention is to provide an inorganic short fiber aggregate to be used for production of such a holding material and its production process.

DISCLOSURE OF THE INVENTION

It has been found that the above object of the present invention is achieved by use of such an aggregate that the aggregate has a particular specific surface area, at least a predetermined number of inorganic short fibers constituting the aggregate have particular fiber diameters, and further, the inorganic short fibers have a particular chemical composition and have an average fiber diameter within a particular range. Further, it has been found that the inorganic short fiber aggregate is produced by discharging a spinning stock solution having a particular composition from a hollow disk having a particular structure under particular conditions to form the spinning stock solution into fibers, followed by drying, aggregation and firing under particular conditions.

Accordingly, the present invention is characterized by the following gists.

(1) An inorganic short fiber aggregate for a holding material, which is an aggregate of inorganic short fibers, characterized in that the specific surface area is at most 10 $m^2/g$, at least 99% (including 100%) of the number of the inorganic short fibers consists of inorganic short fibers having fiber diameters of from 1.5 to 15 μm, and the inorganic short fibers have a chemical composition of from 74 to 86 mass % of an alumina component and from 26 to 14 mass % of a silica component and a mineral composition of from 15 to 60 mass % of mullite, and have an average fiber diameter of from 2 to 8 μm.

(2) The aggregate according to the above (1), wherein when 50 g of the aggregate is put in a stainless steel cylindrical container having a diameter of 80 mm and a depth of 150 mm, a pressure is applied thereto from the upper side, the pressure is released when it reaches 20 MPa, and elutriation classification of the crushed inorganic short fiber aggregate is carried out, the recovered solid material such as fibers is at most 10 mass % when the flow rate of water is 0.50 l/min, at most mass % when the flow rate is 1.38 l/min, and at most 1 mass % when the flow rate is 5.54 l/min.

(3) The aggregate according to the above (1) or (2), wherein the bulk specific gravity in water as an index of the fiber strength is from 0.012 to 0.025, as obtained from the sediment volume obtained in such a manner that 5 g of the aggregate is stirred in 400 ml of water at 1,000 rpm for 10 minutes and then put in a measuring cylinder of 500 ml, water is added so that the total volume becomes 500 ml, and the liquid is left to stand for 30 minutes.

(4) A process for producing the aggregate as defined in the above (1), (2) or (3), which comprises mixing an aluminum oxychloride aqueous solution having a transmittance of at least 80%, a silica sol having a transmittance of at least 75% and a spinning aid to prepare a spinning stock solution having an alumina/silica mass ratio of from 74 to 86%/26 to 14% (total amount of both: 100%) and a viscosity of from 1,000 to 8,000 mPa·s, supplying the spinning stock solution to a hollow disk having a plurality of pores having a diameter of from 0.10 to 30 mm formed on the circumferential surface of the hollow disk, at from 8 to 20 ml/hr per one pore, while rotating the hollow disk at a circumferential speed of from 30 to 80 m/sec, to form the spinning stock solution into fibers, followed by drying, aggregation and firing.

(5) The process according to the above (4), wherein the firing is carried out by using a continuous furnace in such a manner that at the first half stage, the fibers are heated from room temperature to 800 to 1,000° C. at from 10 to 20° C./min at a wind speed in the furnace of from 1 to 5 m/sec, and subsequently at the second half stage of the continuous furnace, the fibers are heated to the maximum temperature of from 1,200 to 1,300° C. at from 20 to 30° C./min and held at the maximum temperature for from 15 to 30 minutes.

(6) A holding material consisting of a sheet-shape formed product comprising the aggregate as defined in the above (1), (2) or (3), and an organic binder contained in the gap of the aggregate.

(7) The holding material according to the above (6), which is a holding material for fixing a catalyst carrier of an automotive exhaust gas clarifying catalyst converter, or a holding material for fixing a honeycomb for a diesel particulate filter.

MODE FOR CARRYING OUT THE INVENTION

Now, the present invention will be explained in further detail.

The chemical composition of inorganic short fibers constituting the inorganic short fiber aggregate for a holding material (hereinafter sometimes referred to simply as an aggregate) of the present invention is such that the alumina component is from 74 to 86 mass %, preferably from 78 to 82 mass %, and the silica component is from 26 to 14 mass %, preferably from 22 to 18 mass %. Such a chemical composition is achieved by mixing an aluminum oxychloride aqueous solution and a silica sol in a desired alumina/silica ratio at the time of preparation of the spinning stock solution. By such a chemical composition, the heat resistance tends to be high and the deterioration due to a high temperature exhaust gas tends to be small, and a holding material produced by such an aggregate has a high repulsive force when a compressive force is applied thereto and at the same time, it is less likely to be eroded by wind due to an exhaust gas, and accordingly, the holding material has improved cushioning function and power for holding a catalyst carrier or a honeycomb. Here, the total amount of the alumina component and the silica component is preferably 100 mass %, however, e.g. $Fe_2O_3$, $Na_2O$ and CaO may be contained up to a total amount of less than 1 mass %.

Further, the mineral composition of the inorganic short fibers is such that mullite is from 15 to 60 mass %, preferably from 20 to 40 mass %, and the rest is one or more of alumina, a spinel type compound derived from silica, medium alumina, silica mineral with low crystallinity, amorphous material, etc. If the mullite is less than 15 mass %, the repulsive force when the holding material is held under compression under heating at about 1,000° C. for a long term will remarkably decrease. Further, if it exceeds 60 mass %, the brittle properties of the inorganic short fibers become remarkable, and breakage is likely to occur, and further, the wind erosion of the holding material due to an exhaust gas tends to be remarkable, and the cushioning function of the holding material is likely to deteriorate. The mineral composition can be adjusted by changing the maximum firing temperature of precursor fibers of the aggregate. Here, the mullite content can be obtained by obtaining the peak intensity of mullite by X-ray diffraction by means of CuKα rays, from an analytical curve prepared based on the peak intensity of alumina short fibers having a known mullite composition.

Further, the inorganic short fibers are required to have an average fiber diameter of from 2 to 8 μm. If the average fiber diameter is less than 2 μm, the repulsive force tends to be small when a holding material produced by using such inorganic short fibers is compressed in the thickness direction, and the power for holding e.g. a honeycomb may be insufficient. Further, if the average fiber diameter exceeds 8 μm, the brittle properties of the inorganic short fibers become remarkable, and the breakage is likely to occur, and further, since the number of inorganic short fibers per unit volume of the holding material decreases, the repulsive force tends to remarkably decrease, and the power for holding e.g. a honeycomb may be insufficient. The preferred average fiber diameter is from 2.5 to 5 μm. Here, the average fiber diameter is defined as an average of the fiber diameters measured from SEM photographs of at least 1,000 inorganic short fibers.

The aggregate of the present invention is an aggregate of the above inorganic short fibers, the specific surface area thereof is at most 10 $m^2/g$, and at least 99% (including 100%) of the number of the fibers consists of inorganic short fibers having fiber diameters of from 1.5 to 15 μm.

If the specific surface area of the aggregate exceeds 10 $m^2/g$, the brittle properties of the inorganic short fibers become remarkable, and the power for holding e.g. a honeycomb may be insufficient. Further, the bulk specific gravity in water as described hereinafter tends to be great. The preferred specific surface area is at most 5 $m^2/g$. Here, the specific surface area is measured by means of a BET method.

Unless at least 99% (including 100%) of the number of the inorganic short fibers of the aggregate consists of short fibers having fiber diameters of from 1.5 to 15 μm, that is, unless the total amount of inorganic short fibers constituting the aggregate, having fiber diameters of less than 1.5 μm and larger than 15 μm, is less than 1 mass %, fibers which have no function to hold e.g. a honeycomb are contained in a large amount, and accordingly the repulsive force tends to be small when a holding material produced by using such fibers is compressed in the thickness direction, and the power for holding e.g. a honeycomb may be insufficient. Further, the brittle properties of the inorganic short fibers become remarkable, and the cushioning function of the holding material is likely to deteriorate. It is particularly preferred that at least 99% (including 100%) of the number of the inorganic short fibers consists of inorganic short fibers having fiber diameters of from 2 to 10 μm. Such fiber diameters of at least 99% (including 100%) of the number of the inorganic short fibers can be measured from SEM photographs of at least 1,000 inorganic short fibers.

The number of the inorganic short fibers having the above fiber diameters of the aggregate may be adjusted, in the process for producing an aggregate of the present invention as described hereinafter, by controlling one or more factors among the viscosity of a spinning stock solution of from 1,000 to 8,000 mPa·s, the diameter of pores formed at the circumferential surface of a hollow disk of from 0.1 to 0.3 mm, a supply/discharge amount per one pore of from 8 to 20 ml/hr and the circumferential speed of the hollow disk of from 30 to 80 m/sec. Further, the specific surface area can be adjusted by controlling one or more factors when the aggregate of inorganic short fibers before firing (hereinafter sometimes referred to as "precursor fibers") is heated at the first half stage of a continuous furnace from room temperature to 800 to 1,000° C. at from 10 to 20° C./min at a wind speed in the furnace of from 1 to 5 m/sec, whereby mainly e.g. moisture, chlorine and a spinning aid are removed, and then subsequently at the second half stage of the continuous furnace, the aggregate is heated to the maximum temperature of from 1,200 to 1,300° C. at from 20 to 30° C./min and held at the maximum temperature for from 15 to 30 minutes.

It has been found that among the above aggregates, preferred is such an aggregate that when 50 g of a sample is put in a stainless steel cylindrical container having a diameter of 80 mm and a depth of 150 mm, a plate is put on the upper side and pressure is applied thereto, the pressure is released when it reaches 20 MPa, and elutriation classification (one type of sedimentation classification) of the crashed aggregate is carried out, the recovered solid material such as fibers is preferably at most 10 mass % when the flow rate of water is 0.50 l/min, it is preferably at most 5 mass % when the flow rate is 1.38 l/min, and it is preferably at most 1 mass % when the flow rate is 5.54 l/min. Particularly, suitable is such an aggregate that the recovered solid material is at most 1 mass % when the flow rate of water is 1.38 l/min, and it is at most 0.1 mass % when the flow rate is 5.54 l/min.

Here, the flow rate of water of 0.50 l/min is a classification point corresponding to a spherical diameter of 30 μm, the flow rate of 1.38 l/min is a classification point corresponding to a spherical diameter of 50 μm, and the flow rate of 5.54 l/min is a classification point corresponding to a spherical diameter of 100 μm. By employing this means, it becomes possible to easily evaluate the fiber diameter distribution of the inorganic short fibers constituting the aggregate, and the smaller the amount of the recovered product at each flow rate of water, the higher the power for holding e.g. a honeycomb. Such a suitable aggregate can be produced particularly by controlling the viscosity of a spinning stock solution to from 1,000 to 8,000 mPa·s and the circumferential speed of a hollow disk to from 30 to 80 m/sec, in the process for producing an aggregate of the present invention as described hereinafter.

Further, it has been found that among the above aggregates, suitable is one having a bulk specific gravity in water as an index of the fiber strength of preferably from 0.012 to 0.025, particularly preferably from 0.013 to 0.020, as obtained from the sediment volume obtained in such a manner that 5 g of the aggregate is stirred in 400 ml of water at 1,000 rpm for 10 minutes by using a stirring machine and then put in a measuring cylinder of 500 ml, water is added so that the total volume becomes 500 ml, and the liquid is left to stand for 30 minutes. Measurement of 5 g of the sample is carried out by cutting four samples having dimensions with a width of 15 mm, a length of 50 mm and a thickness idiomorphically from the upper layer to the lower layer per one sample, at equal distances in the aggregate width direction, by e.g. a cutter, and combining these four samples to bring the total amount to 5 g.

If the bulk specific gravity in water of the aggregate exceeds 0.025, the fiber strength tends to be weak, and a holding material of a sheet-shape formed product produced from such an aggregate is likely to be eroded by wind due to an exhaust gas, and a gap between the holding material and e.g. a honeycomb is likely to form, and the exhaust gas may weak or e.g. a honeycomb may slip down. Further, if the bulk specific gravity in water is less than 0.012, the fiber strength tends to be too high, and cotton opening tends to be non-uniform when the aggregate is formed into a sheet, and accordingly there will be unevenness in the thickness of the sheet-shape formed product, and the power for holding e.g. a honeycomb may be insufficient. The bulk specific gravity in water of the aggregate can be adjusted by controlling one or more of the viscosity and the supply/discharge amount per one pore of the spinning stock solution, the peripheral speed of the hollow disk and the conditions for firing the precursor fibers, in the process for producing an aggregate of the present invention as described hereinafter.

Now, the process for producing an aggregate of the present invention will be explained below.

First, an aluminum oxychloride aqueous solution having a transmittance of at least 80% as an alumina content and a silica sol having a transmittance of at least 75% as a silica content are used, they are mixed in such a proportion that the alumina is preferably from 74 to 86 mass %, particularly preferably from 77 to 82 mass %, and the silica is preferably from 26 to 14 mass %, particularly preferably from 22 to 18 mass %, and a spinning aid is further added thereto to prepare a spinning stock solution having a viscosity of preferably from 1,000 to 8,000 mPa·s. The spinning aid is to impart viscosity to a solution containing the alumina and silica components and to make the solution have viscous properties. For example, polyvinyl alcohol, starch, polyethylene oxide or polyethylene glycol may, for example, be used.

If the transmittance of the aluminum oxychloride is less than 80% or the transmittance of the silica sol is less than 75%, the brittle properties of the inorganic short fibers tend to be remarkable, the cushioning function of the holding material is likely to deteriorate, and further, gelation of the spinning stock solution tends to occur, and coarse crystals tend to be contained in a large amount in the inorganic short fibers constituting the aggregate, whereby the bulk specific gravity in water tends to be remarkably great. Further, the firing temperature to bring a desired mineral composition tends to be very unstable, and the temperature control tends to be difficult. The transmittance is measured by means of absorption photometry.

Further, if the viscosity of the spinning stock solution is less than 1,000 mPa·s, the spinning properties tend to be poor, thus causing shots, and if it exceeds 8,000 mPa·s, the average fiber diameter of the inorganic short fibers tends to be remarkably large, and the bulk specific gravity in water tends to be great. The preferred viscosity of the spinning stock solution is from 1,500 to 6,000 mPa·s.

Then, the spinning stock solution is supplied to a hollow disk having a plurality of pores having a diameter of from 0.1 to 0.3 mm formed on the circumferential surface, at from 8 to 20 ml/hr per one pore, and discharged therefrom to be formed into fibers. This formation into fibers is carried out by rotating the hollow disk at a circumferential speed of from 30 to 80 m/sec. The supply/discharge amount per one pore is calculated by dividing the amount of the spinning stock solution supplied to the hollow disk per one hour by the number of pores formed on the circumferential surface of the hollow disk.

If the diameter of the above pores exceeds the range of from 0.1 to 0.3 mm, it tends to be difficult to obtain desired fiber diameters, and further, the spinning properties tend to be poor, thus causing shots. The preferred diameter of the pores is from 0.2 to 0.28 mm. Further, if the supply amount per one pore is less than 8 ml/hr, or if the circumferential speed of the rotating disk is less than 30 m/sec, the spinning properties tend to be poor, thus causing shots, and if the supply amount per one pore exceeds 20 ml/hr, the average fiber diameter of the inorganic short fibers tends to be remarkably large, and the bulk specific gravity in water tends to be great. On the other hand, if the circumferential speed of the rotating disk exceeds 80 m/sec, the fibers tend to be thin more than necessary and in addition, operation tends to be difficult. The supply amount per one pore is preferably from 10 to 18 ml/hr, and the circumferential speed of the rotating disk is preferably from 40 to 60 m/sec.

The number of pores is preferably at least 200, particularly preferably at least 500, in view of productivity.

The liquid threads which come out from the pores are aggregated in a thread collecting room while being dried and formed into precursor fibers, which are fired and formed into the aggregate of the present invention. Drying is carried out preferably by hot air of from 150 to 600° C. Aggregation is carried out by drawing a dried product of the liquid threads suspended in the air from the lower portion of the thread collecting room.

Firing of the precursor fibers is carried out by using a continuous furnace such as a roller house furnace or a walking beam furnace in an air atmosphere. First, at the first half stage of the continuous furnace, the precursor fibers are heated from room temperature to 800 to 1,000° C. preferably at from 10 to 20° C./min at a wind speed in the furnace of preferably from 1 to 5 m/sec, whereby mainly e.g. moisture, chlorine and the spinning aid in the precursor fibers are removed, and subsequently at the second half stage of the continuous furnace, the precursor fibers are heated to the maximum temperature of from 1,200 to 1,300° C. preferably at from 20 to 30° C./min and held at the maximum temperature preferably for from 15 to 30 minutes.

If the wind speed in the furnace is less than 1 m/sec, the removed chlorine, organic components in the spinning aid, etc. are likely to stay in the furnace and impair the fiber physical properties, and if the wind speed in the furnace exceeds 5 m/sec, it tends to be difficult to control the temperature in the furnace. Further, if the firing temperature at the first half stage of the continuous furnace is less than 800° C., organic components contained in the spinning aid may not completely be removed, and when firing at the maximum temperature is carried out at the subsequent second half stage of the continuous furnace, the specific surface area and the bulk specific gravity in water will be remarkably poor. Further, if the firing temperature at the first half stage is at least 1,000° C., the furnace length at the first half stage of the continuous furnace has to be longer than necessary. On the other hand, if the temperature-raising rate at the first half stage of the continuous furnace is less than 10° C./min, the furnace length at the first half stage of the continuous furnace has to be longer than necessary in order to achieve the desired temperature, and if the temperature-raising rate exceeds 30° C./min, organic components in the precursor may fire due to sudden heating, and the specific surface area and the bulk specific gravity in water will be remarkably impaired.

Further, if the maximum temperature at the second half stage of the continuous furnace exceeds the range of from 1,200° to 1,300° C., it tends to be difficult to have the mullite have a desired crystallinity. Further, if the temperature-raising rate at the second half stage of the continuous furnace is less than 20° C./min, the furnace length at the second half stage of the continuous furnace has to be longer than necessary in order to achieve the desired temperature, and if the temperature-raising rate exceeds 30° C./min, there may be unevenness in the crystallinity of the mullite in the aggregate thickness direction due to sudden heating. On the other hand, if the retention time at the maximum temperature is less than 15 minutes, there may be unevenness in the crystallinity of the mullite in the aggregate thickness direction, and if it exceeds 30 minutes, the furnace length at the second half stage of the continuous furnace has to be longer than necessary.

Now, the holding material of the present invention will be explained. The holding material of the present invention consists of a sheet-shape formed product comprising the aggregate of the present invention and an organic binder contained in the gap of the aggregate. In such a holding material, the aggregate bound by the organic binder is released by destruction of the organic binder by fire due to heating during use, and the aggregate expands in the thickness direction to generate a repulsive force. Due to this repulsive force, e.g. a honeycomb of DPF or a catalyst carrier of a catalyst converter is held, and slip or breakage due to dropping of e.g. the honeycomb or the catalyst carrier can be reduced.

In order to make the organic binder be contained or present in the gap of the aggregate, a sheet making method is preferred. As the sheet making method, a method of employing a continuous sheet making equipment such as a cylinder paper machine or a Fourdrinier paper machine, a batch sheet making system of pouring a slurry into a sheet making box, or a system of taking the aggregate up from a slurry with a flat tint may, for example, be employed. In such a case, mixing of the organic binder is carried out by preliminarily mixing the inorganic short fibers and the organic binder in a predetermined amount to prepare a slurry, by forming a slurry of inorganic short fibers alone into a cake, and then spraying a solution containing the organic binder from the upper side of the cake and drawing it from the lower side, or by combination thereof.

Drying of the cake is carried out preferably by holding it at a clearance corresponding to from 40 to 100% of the desired thickness after drying, while applying a compressive force. As a batch system, a method of sandwiching a liner to secure a certain plate distance with the cake between two perforated plates and drying the cake in a dryer, and as a continuous system, a method of providing upper and lower rollers with a certain distance in a tunnel type drier, and passing the cake therethrough to dry it may, for example, be employed.

The content of the organic binder is preferably from 0.5 to 10 mass %, particularly preferably from 3 to 6 mass %. By employing such a content, when the organic binder is burned and destroyed by fire due to e.g. an exhaust gas of an automobile, the holding material expands in the thickness direction, and the repulsive force of the aggregate may easily be developed. If the content of the organic binder is less than 0.5 mass %, this effect tends to be small, and if it exceeds 10 mass %, the organic binder may be destroyed by fire in an incomplete combustion state to generate reducing gas, which may cause malfunction of various sensors provided in the exhaust system of an automobile, and a separate countermeasure will be required.

As the organic binder, preferred is one which is destroyed by fire at a temperature of preferably at most 700° C., particularly preferably from 200 to 500° C., and which has an adhesive strength to suppress the repulsive force of the aggregate. It may, for example, be an acrylic emulsion, an acrylic styrene emulsion, a vinyl acetate emulsion, a vinyl acetate/veova emulsion, an EVA (ethylene/vinyl acetate copolymer) emulsion, an ethylene/vinyl acetate/vinyl chloride emulsion, a vinyl acetate/acrylic emulsion, a polyethylene emulsion, a vinyl chloride latex, an ethylene/vinyl chloride latex, a vinylidene chloride latex, a polystyrene emulsion, a urethane emulsion, a polyester emulsion, an epoxy emulsion, a natural rubber latex, a polybutadiene latex, a SBR (styrene/butadiene type copolymer) latex, a NBR (acrylonitrile/butadiene type copolymer) latex, a MBR (methyl methacrylate/butadiene type copolymer) latex, a VP (2-vinylpyridine/styrene/butadiene type copolymer) latex, a chloroprene latex, an IR (isoprene rubber) latex, polyvinyl alcohol or starch. Preferred is an acrylic emulsion, a modified acrylic type emulsion or a NBR latex, which has high adhesive strength and with which flexibility of the holding material can be secured at the time of assembling.

The slurry is prepared by mixing the inorganic short fibers and a medium and fluoridizing them. As the medium, water, an organic medium or both may be used. The organic solvent may, for example, be an alcohol such as methyl alcohol, ethyl alcohol or isopropyl alcohol, an aromatic hydrocarbon such as benzene or toluene, an aliphatic solvent such as acetone or chloroform or a heterocyclic solvent such as tetrahydrofuran. The slurry concentration i.e. the content of the inorganic short fibers in the slurry is preferably from 0.025 to 0.7 mass %, particularly preferably from 0.2 to 0.5 mass %. If the slurry concentration is too low, the productivity tends to be poor, and if it is too high, dispersion of the fibers in the slurry tends to be poor. When the slurry concentration is within this range, the fibers in the slurry will be favorably dispersed, and accordingly the amount of the fibers in the respective portions of the holding material will be uniform.

The holding material of the present invention may be used not only as a holding material for fixing a catalyst carrier of a catalyst converter and a holding material for fixing a honeycomb of DPF, but also as a joint filler for a high temperature refractory.

EXAMPLES

Now, the present invention will be explained in further detail with reference to Examples and Comparative Examples.

Examples 1 to 3 and Comparative Examples 1 and 2

Using an aluminum oxychloride aqueous solution having a transmittance of 90% as an alumina content and a silica sol having a transmittance of 90% as a silica content, they were mixed so that the alumina would be from 70 to 98 mass % and the silica would be from 30 to 2 mass % (total amount of both: 100 mass %), and polyvinyl alcohol as a spinning aid was further added thereto to prepare a spinning stock solution having a viscosity of 5,000 mPa·s.

The spinning stock solution was supplied to a hollow disk having a diameter of 150 mm and having 300 pores having a diameter of 0.25 mm formed on the circumferential surface at 15 ml/hr per one pore, and the disk was rotated at a circumferential speed of 50 m/sec to form the spinning stock solution into fibers (liquid threads), which were drawn from the lower portion of a thread collecting room by suction and aggregated while being dried by a hot air of 300° C. to produce precursor fibers. Then, the precursor fibers were heated from room temperature to 900° C. at 15° C./min at a wind speed of 3 m/sec at the first half stage of a roller house furnace, and subsequently at the second half stage of the continuous furnace, they were heated to the maximum temperature of 1,250° C. at 25° C./min and held at the maximum temperature for 20 minutes to carry out firing, whereby an aggregate as shown in Table 1 was produced and cut into a size of 25 mm×25 mm.

As evaluation for the wind erosion resistance, the bulk specific gravity in water was measured by using a stirring machine PROMIX PR-1200 (four bladed, blade diameter 75 mm), tradename, manufactured by SHIBATA. Further, it was confirmed by X-ray diffraction by means of CuKα rays that the rest of the mineral composition was one or more of alumina, a spinel type compound derived from silica, medium alumina, silica mineral having low crystallinity and an amorphous material.

Then, 129 kg of water was added to 650 g of the cut aggregate, stirring was carried out at a low rate to prepare a slurry having an inorganic short fiber concentration of 0.5 mass %, and the entire thereof was poured into a sheet making box having dimensions at the bottom net portion of 900 mm×600 mm, and water was drawn out by suction from under the bottom net to produce a cake. While carrying out suction, a NBR latex ("Nipol 1312", tradename, manufactured by ZEON CORPORATION) as an organic binder was sprayed from above the cake so that it soaked into the entire cake.

Then, the cake was sandwiched between two stainless steel punching plates (dimensions: 950 mm×650 mm×5 mm, hole diameter: 3 mm, hole pitch: parallel holes with a distance of 6 mm) and held by a clamp on both sides to fix the thickness of the cake to 6 mm, and dried in such a state by a hot air drier at 100° C. for 3 hours to prepare a holding material. The content of the NBR latex was 6 mass % as the NBR purity content.

To evaluate the performance of the obtained holding material, the holding material was fired in an electric furnace at 700° C. to remove the binder and compressed so that the compressed bulk density (G.B.D) would be 0.15 g/cm$^3$, 0.30 g/cm$^3$ or 0.45 g/cm$^3$, and the repulsive force after being held under compression at room temperature for 0 hour, the repulsive force after being held under compression at room temperature for 20 hours and the repulsive force after being held under compression under heating at 1,000° C. for 20 hours, were measured by means of a compression tester ("RTC-1210A", manufactured by A&D Company, Ltd.). Further, based on these results, the estimated repulsive force after being held under compression under heating at 1,000° C. for 10 years was calculated from the power approximation formula. The results are shown in Table 1.

The repulsive forces as disclosed in sections A to D of holding material in Table 1 are as follows.

A: Values after being held under compression at the respective G.B.D at room temperature for 0 hour.

B: Values after being held under compression at the respective G.B.D at room temperature for 20 hours.

C: Values after being held under compression at the respective G.B.D under heating at 1,000° C. for 20 hours.

D: Estimated values after being held under compression at the respective G.B.D under heating at 1,000° C. for 10 years.

TABLE 1

|  |  | Ex. 1 | Ex. 2 | Ex. 3 | Comp. Ex. 1 | Comp. Ex. 2 |
|---|---|---|---|---|---|---|
| Production conditions | Transmittance of aluminum oxychloride (%) |  |  | 90 |  |  |
|  | Transmittance of silica sol (%) |  |  | 90 |  |  |
|  | Stock solution viscosity (mPa · s) |  |  | 5000 |  |  |
|  | Pore diameter (mm) |  |  | 0.25 |  |  |

TABLE 1-continued

|  |  |  | Ex. 1 | Ex. 2 | Ex. 3 | Comp. Ex. 1 | Comp. Ex. 2 |
|---|---|---|---|---|---|---|---|
|  | Circumferential speed of hollow disk (m/sec) |  | | | 50 | | |
|  | Supply amount per one pore (ml/hr) |  | | | 15 | | |
|  | Wind speed in furnace (m/sec) |  | | | 3 | | |
|  | Maximum temperature at furnace first half stage (° C.) |  | | | 900 | | |
|  | Temperature-raising rate at furnace first half stage (° C./min) |  | | | 15 | | |
|  | Maximum temperature at furnace second half stage (° C.) |  | | | 1250 | | |
|  | Temperature-raising rate at furnace second half stage (° C./min) |  | | | 25 | | |
|  | Retention time at maximum temperature (min) |  | | | 20 | | |
| Aggregate | Chemical composition | Alumina (mass %) | 74 | 80 | 86 | 70 | 98 |
|  |  | Silica (mass %) | 26 | 20 | 14 | 30 | 2 |
|  | Mineral composition | Mullite (mass %) | 35 | 30 | 25 | 40 | 10 |
|  | Specific surface area (m$^2$/g) |  | 2.8 | 3.0 | 3.4 | 2.5 | 37.2 |
|  | Average fiber diameter of inorganic short fibers (μm) |  | 2.9 | 3.0 | 3.0 | 2.9 | 3.2 |
|  | Fiber diameter range of 99% of the total number of fibers (μm) |  | 1.8 to 8.9 | 2.2 to 9.3 | 2.0 to 9.3 | 2.0 to 9.5 | 2.0 to 9.4 |
|  | Recovered amount (mass %) | Flow rate: 0.50 (l/min) | 8.0 | 8.4 | 8.1 | 8.2 | 8.1 |
|  |  | Flow rate: 1.38 (l/min) | 0.54 | 0.60 | 0.62 | 0.65 | 0.41 |
|  |  | Flow rate: 5.54 (l/min) | 0.01 | 0.01 | 0.01 | 0.01 | 0.01 |
|  | Bulk specific gravity in water |  | 0.0135 | 0.0150 | 0.0180 | 0.0125 | 0.0350 |
| Holding material | Repulsive force (kPa) | A G.B.D = 0.15 (g/cm$^3$) | 50 | 48 | 40 | 60 | 20 |
|  |  | G.B.D = 0.30 (g/cm$^3$) | 380 | 370 | 340 | 420 | 200 |
|  |  | G.B.D = 0.45 (g/cm$^3$) | 910 | 900 | 870 | 960 | 660 |
|  |  | B G.B.D = 0.15 (g/cm$^3$) | 32 | 36 | 34 | 20 | 16 |
|  |  | G.B.D = 0.30 (g/cm$^3$) | 315 | 325 | 330 | 210 | 170 |
|  |  | G.B.D = 0.45 (g/cm$^3$) | 770 | 800 | 790 | 580 | 520 |
|  |  | C G.B.D = 0.15 (g/cm$^3$) | 24 | 28 | 26 | 6 | 10 |
|  |  | G.B.D = 0.30 (g/cm$^3$) | 225 | 250 | 240 | 50 | 60 |
|  |  | G.B.D = 0.45 (g/cm$^3$) | 485 | 500 | 500 | 200 | 185 |
|  |  | D G.B.D = 0.15 (g/cm$^3$) | 16 | 22 | 20 | 1 | 5 |
|  |  | G.B.D = 0.30 (g/cm$^3$) | 160 | 205 | 210 | 18 | 23 |
|  |  | G.B.D = 0.45 (g/cm$^3$) | 305 | 355 | 340 | 70 | 60 |

Example 4 and Comparative Examples 3 to 5

The operation was carried out in the same manner as in Example 1 except that an aluminum oxychloride aqueous solution having a transmittance of from 70 to 80% and a silica sol having a transmittance of from 65 to 75% were mixed so that the alumina would be 80 mass % and the silica would be 20 mass %. The results are shown in Table 2.

TABLE 2

|  |  |  | Ex. 4 | Comp. Ex. 3 | Comp. Ex. 4 | Comp. Ex. 5 |
|---|---|---|---|---|---|---|
| Production conditions | Transmittance of aluminum oxychloride (%) |  | 80 | 70 | 80 | 70 |
|  | Transmittance of silica sol (%) |  | 75 | 75 | 65 | 65 |
|  | Stock solution viscosity (mPa · s) |  | | 5000 | | |
|  | Pore diameter (mm) |  | | 0.25 | | |
|  | Circumferential speed of hollow disk (m/sec) |  | | 50 | | |
|  | Supply amount per one pore (ml/hr) |  | | 15 | | |
|  | Wind speed in furnace (m/sec) |  | | 3 | | |
|  | Maximum temperature at furnace first half stage (° C.) |  | | 900 | | |
|  | Temperature-raising rate at furnace first half stage (° C./min) |  | | 15 | | |
|  | Maximum temperature at furnace second half stage (° C.) |  | | 1250 | | |
|  | Temperature-raising rate at furnace second half stage (° C./min) |  | | 25 | | |
|  | Retention time at maximum temperature (min) |  | | 20 | | |
| Aggregate | Chemical composition | Alumina (mass %) | 80 | 80 | 80 | 80 |
|  |  | Silica (mass %) | 20 | 20 | 20 | 20 |
|  | Mineral composition | Mullite (mass %) | 30 | 20 | 20 | 10 |
|  | Specific surface area (m$^2$/g) |  | 3.1 | 5.2 | 5.8 | 5.6 |
|  | Average fiber diameter of inorganic short fibers (μm) |  | 3.6 | 3.2 | 3.5 | 3.0 |
|  | Fiber diameter range of 99% of the total number of fibers (μm) |  | 1.8 to 8.0 | 2.6 to 9.6 | 1.5 to 8.1 | 2.7 to 9.6 |
|  | Recovered amount (mass %) | Flow rate: 0.50 (l/min) | 7.8 | 23.8 | 22.0 | 27.0 |
|  |  | Flow rate: 1.38 (l/min) | 0.46 | 8.75 | 8.54 | 10.85 |
|  |  | Flow rate: 5.54 (l/min) | 0.01 | 1.25 | 1.30 | 1.45 |
|  | Bulk specific gravity in water |  | 0.0125 | 0.0365 | 0.0375 | 0.0375 |
| Holding material | Repulsive force (kpa) | A G.B.D = 0.15 (g/cm$^3$) | 44 | 18 | 16 | 14 |
|  |  | G.B.D = 0.30 (g/cm$^3$) | 360 | 195 | 200 | 175 |
|  |  | G.B.D = 0.45 (g/cm$^3$) | 860 | 680 | 690 | 660 |
|  |  | B G.B.D = 0.15 (g/cm$^3$) | 34 | 14 | 12 | 10 |
|  |  | G.B.D = 0.30 (g/cm$^3$) | 305 | 180 | 175 | 155 |
|  |  | G.B.D = 0.45 (g/cm$^3$) | 780 | 560 | 555 | 535 |

TABLE 2-continued

|   |   | Ex. 4 | Comp. Ex. 3 | Comp. Ex. 4 | Comp. Ex. 5 |
|---|---|---|---|---|---|
| C | G.B.D = 0.15 (g/cm³) | 24 | 8 | 8 | 8 |
|   | G.B.D = 0.30 (g/cm³) | 230 | 40 | 45 | 30 |
|   | G.B.D = 0.45 (g/cm³) | 480 | 95 | 95 | 65 |
| D | G.B.D = 0.15 (g/cm³) | 20 | 5 | 5 | 2 |
|   | G.B.D = 0.30 (g/cm³) | 180 | 20 | 20 | 16 |
|   | G.B.D = 0.45 (g/cm³) | 300 | 25 | 25 | 20 |

Examples 5 to 12 and Comparative Examples 6 to 13

The operation was carried out in the same manner as in Example 1 except that an aluminum oxychloride aqueous solution having a transmittance of 90% and a silica sol having a transmittance of 90% were mixed so that the alumina would be 80 mass % and the silica would be 20 mass %, the viscosity was from 300 to 25,000 mPa·s, the diameter of the pores was from 0.05 to 1.0 mm, the supply amount per one pore was from 4 to 40 ml/min, and the circumferential speed of the hollow disk was from 10 to 90 m/sec. The results are shown in Tables 3 and 4.

TABLE 3

| | | | Ex. 5 | Ex. 6 | Ex. 7 | Ex. 8 | Ex. 9 | Ex. 10 | Ex. 11 | Ex. 12 |
|---|---|---|---|---|---|---|---|---|---|---|
| Production conditions | Transmittance of aluminum oxychloride (%) | | | | | | 90 | | | |
| | Transmittance of silica sol (%) | | | | | | 90 | | | | |
| | Stock solution viscosity (mPa·s) | | 1000 | 8000 | 5000 | 5000 | 5000 | 5000 | 5000 | 5000 |
| | Pore diameter (mm) | | 0.25 | 0.25 | 0.1 | 0.3 | 0.25 | 0.25 | 0.25 | 0.25 |
| | Circumferential speed of hollow disk (m/sec) | | 50 | 50 | 50 | 50 | 50 | 50 | 30 | 80 |
| | Supply amount per one pore (ml/hr) | | 15 | 15 | 15 | 15 | 8 | 20 | 15 | 15 |
| | Wind speed in furnace (m/sec) | | | | | | 3 | | | |
| | Maximum temperature at furnace first half stage (° C.) | | | | | | 900 | | | |
| | Temperature-raising rate at furnace first half stage (° C./min) | | | | | | 15 | | | |
| | Maximum temperature at furnace second half stage (° C.) | | | | | | 1250 | | | |
| | Temperature-raising rate at furnace second half stage (° C./min) | | | | | | 25 | | | |
| | Retention time at maximum temperature (min) | | | | | | 20 | | | |
| Aggregate | Chemical composition | Alumina (mass %) | 80 | 80 | 80 | 80 | 80 | 80 | 80 | 80 |
| | | Silica (mass %) | 20 | 20 | 20 | 20 | 20 | 20 | 20 | 20 |
| | Mineral composition | Mullite (mass %) | 30 | 30 | 30 | 30 | 30 | 30 | 30 | 30 |
| | Specific surface area (m²/g) | | 3.1 | 3.2 | 2.8 | 3.3 | 3.2 | 3.0 | 3.0 | 3.1 |
| | Average fiber diameter of inorganic short fibers (μm) | | 2.6 | 4.6 | 2.5 | 6.0 | 2.2 | 6.5 | 4.2 | 2.4 |
| | Fiber diameter range of 99% of the total number of fibers (μm) | | 1.8 to 8.0 | 2.6 to 9.6 | 1.5 to 8.1 | 2.7 to 9.6 | 1.8 to 7.0 | 2.9 to 9.6 | 2.5 to 9.7 | 1.7 to 8.1 |
| | Recovered amount (mass %) | Flow rate: 0.50 (l/min) | 7.8 | 8.8 | 8.0 | 9.0 | 7.3 | 9.2 | 9.0 | 7.3 |
| | | Flow rate: 1.38 (l/min) | 0.46 | 0.75 | 0.54 | 0.85 | 0.44 | 0.87 | 0.68 | 0.54 |
| | | Flow rate: 5.54 (l/min) | 0.01 | 0.01 | 0.01 | 0.01 | 0.01 | 0.01 | 0.01 | 0.01 |
| | Bulk specific gravity in water | | 0.0125 | 0.0215 | 0.0135 | 0.0225 | 0.0125 | 0.0230 | 0.0205 | 0.0135 |
| Holding material | Repulsive force (kPa) | A G.B.D = 0.15 (g/cm³) | 44 | 42 | 40 | 42 | 42 | 40 | 40 | 42 |
| | | G.B.D = 0.30 (g/cm³) | 360 | 345 | 355 | 340 | 355 | 335 | 345 | 350 |
| | | G.B.D = 0.45 (g/cm³) | 860 | 850 | 870 | 840 | 850 | 840 | 845 | 860 |
| | | B G.B.D = 0.15 (g/cm³) | 34 | 32 | 34 | 34 | 32 | 30 | 30 | 32 |
| | | G.B.D = 0.30 (g/cm³) | 305 | 305 | 310 | 305 | 315 | 300 | 305 | 310 |
| | | G.B.D = 0.45 (g/cm³) | 780 | 770 | 775 | 765 | 765 | 755 | 765 | 750 |
| | | C G.B.D = 0.15 (g/cm³) | 24 | 22 | 20 | 20 | 22 | 18 | 20 | 20 |
| | | G.B.D = 0.30 (g/cm³) | 230 | 235 | 210 | 225 | 220 | 215 | 220 | 215 |
| | | G.B.D = 0.45 (g/cm³) | 480 | 470 | 480 | 465 | 485 | 460 | 470 | 480 |
| | | D G.B.D = 0.15 (g/cm³) | 20 | 20 | 17 | 20 | 20 | 20 | 20 | 15 |
| | | G.B.D = 0.30 (g/cm³) | 180 | 175 | 165 | 170 | 170 | 165 | 165 | 160 |
| | | G.B.D = 0.45 (g/cm³) | 300 | 305 | 310 | 305 | 330 | 300 | 310 | 320 |

TABLE 4

|  |  | Comp. Ex. 6 | Comp. Ex. 7 | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|---|---|
| Production conditions | Transmittance of aluminum oxychloride (%) | | | | 90 | | | | |
| | Transmittance of silica sol (%) | | | | | 90 | | | |
| | Stock solution viscosity (mPa·s) | 300 | 25000 | 5000 | 5000 | 5000 | 5000 | 5000 | 5000 |
| | Pore diameter (mm) | 0.25 | 0.25 | 0.05 | 1.0 | 0.25 | 0.25 | 0.25 | 0.25 |
| | Circumferential speed of hollow disk (m/sec) | 40 | 40 | 40 | 40 | 40 | 40 | 10 | 90 |
| | Supply amount per one pore (ml/hr) | 15 | 15 | 15 | 15 | 4 | 40 | 15 | 15 |
| | Wind speed in furnace (m/sec) | | | | 3 | | | | |
| | Maximum temperature at furnace first half stage (° C.) | | | | 900 | | | | |
| | Temperature-raising rate at furnace first half stage (° C./min) | | | | 15 | | | | |
| | Maximum temperature at furnace second half stage (° C.) | | | | 1250 | | | | |
| | Temperature-raising rate at furnace second half stage (° C./min) | | | | 25 | | | | |
| | Retention time at maximum temperature (min) | | | | 20 | | | | |
| Aggregate | Chemical composition Alumina (mass %) | 80 | 80 | 80 | 80 | 80 | 80 | 80 | 80 |
| | Silica (mass %) | 20 | 20 | 20 | 20 | 20 | 20 | 20 | 20 |
| | Mineral composition Mullite (mass %) | 30 | 30 | 30 | 30 | 30 | 30 | 30 | 30 |
| | Specific surface area (m²/g) | 2.9 | 3.8 | 2.9 | 3.2 | 2.8 | 3.6 | 3.6 | 3.0 |
| | Average fiber diameter of inorganic short fibers (μm) | 1.4 | 14.2 | 1.2 | 10.0 | 1.8 | 12.4 | 10.6 | 1.4 |
| | Fiber diameter range of 99% of the total number of fibers (μm) | 1.0 to 5.0 | 8.3 to 23.0 | 0.4 to 3.3 | 6.3 to 18.0 | 0.6 to 3.7 | 7.7 to 22.1 | 7.0 to 17.2 | 0.6 to 3.6 |
| | Recovered amount (mass %) Flow rate: 0.50 (l/min) | 15.00 | 24.8 | 5.4 | 24.0 | 23.0 | 26.0 | 19.2 | 4.4 |
| | Flow rate: 1.38 (l/min) | 4.05 | 8.45 | 0.26 | 8.05 | 9.20 | 9.40 | 8.20 | 0.26 |
| | Flow rate: 5.54 (l/min) | 2.50 | 1.55 | 0.01 | 1.55 | 1.65 | 1.65 | 1.50 | 0.01 |
| Holding material | Repulsive force (kPa) A G.B.D = 0.15 (g/cm³) | 22 | 18 | 20 | 20 | 22 | 20 | 20 | 20 |
| | G.B.D = 0.30 (g/cm³) | 200 | 195 | 210 | 195 | 225 | 210 | 215 | 210 |
| | G.B.D = 0.45 (g/cm³) | 700 | 690 | 700 | 690 | 705 | 680 | 705 | 710 |
| | B G.B.D = 0.15 (g/cm³) | 18 | 16 | 16 | 16 | 18 | 18 | 14 | 18 |
| | G.B.D = 0.30 (g/cm³) | 180 | 185 | 195 | 185 | 180 | 185 | 185 | 185 |
| | G.B.D = 0.45 (g/cm³) | 565 | 565 | 580 | 570 | 575 | 540 | 555 | 560 |
| | C G.B.D = 0.15 (g/cm³) | 12 | 8 | 12 | 10 | 12 | 10 | 12 | 10 |
| | G.B.D = 0.30 (g/cm³) | 60 | 40 | 66 | 56 | 60 | 60 | 65 | 56 |
| | G.B.D = 0.45 (g/cm³) | 120 | 90 | 135 | 120 | 125 | 105 | 115 | 120 |
| | D G.B.D = 0.15 (g/cm³) | 10 | 5 | 12 | 8 | 5 | 5 | 5 | 5 |
| | G.B.D = 0.30 (g/cm³) | 20 | 20 | 30 | 24 | 22 | 25 | 20 | 16 |
| | G.B.D = 0.45 (g/cm³) | 45 | 25 | 44 | 32 | 30 | 35 | 34 | 30 |

Examples 13 to 18 and Comparative Examples 14 to 19

The operation was carried out in the same manner as in Example 1 except that an aluminum oxychloride aqueous solution having a transmittance of 90% and a silica sol having a transmittance of 90% were mixed so that the alumina would be 80 mass % and the silica would be 20 mass %, and as the firing conditions at the continuous furnace first half stage, the wind speed was from 0 to 10 m/sec, and the temperature was increased from room temperature to 700 to 1,100° C. at from 5 to 30° C./min. The results are shown in Tables 5 and 6.

TABLE 5

|  |  | Ex. 13 | Ex. 14 | Ex. 15 | Ex. 16 | Ex. 17 | Ex. 18 |
|---|---|---|---|---|---|---|---|
| Production conditions | Transmittance of aluminum oxychloride (%) | | | | 90 | | |
| | Transmittance of silica sol (%) | | | | 90 | | |
| | Stock solution viscosity (mPa·s) | | | | 5000 | | |
| | Pore diameter (mm) | | | | 0.25 | | |
| | Circumferential speed of hollow disk (m/sec) | | | | 50 | | |
| | Supply amount per one pore (ml/hr) | | | | 15 | | |
| | Wind speed in furnace (m/sec) | 1 | 5 | 3 | 3 | 3 | 3 |
| | Maximum temperature at furnace first half stage (° C.) | 900 | 900 | 800 | 1000 | 900 | 900 |
| | Temperature-raising rate at furnace first half stage (° C./min) | 15 | 15 | 15 | 15 | 10 | 20 |

TABLE 5-continued

|  |  |  |  | Ex. 13 | Ex. 14 | Ex. 15 | Ex. 16 | Ex. 17 | Ex. 18 |
|---|---|---|---|---|---|---|---|---|---|
|  | Maximum temperature at furnace second half stage (° C.) | | | | | 1250 | | | |
|  | Temperature-raising rate at furnace second half stage (° C./min) | | | | | 25 | | | |
|  | Retention time at maximum temperature (min) | | | | | 20 | | | |
| Aggregate | Chemical composition | Alumina (mass %) | | 80 | 80 | 80 | 80 | 80 | 80 |
|  |  | Silica (mass %) | | 20 | 20 | 20 | 20 | 20 | 20 |
|  | Mineral composition | Mullite (mass %) | | 30 | 30 | 30 | 30 | 30 | 30 |
|  | Specific surface area ($m^2/g$) | | | 3.2 | 2.9 | 3.8 | 3.1 | 3.0 | 3.8 |
|  | Average fiber diameter of inorganic short fibers (μm) | | | 3.1 | 3.2 | 3.2 | 3.1 | 3.0 | 3.2 |
|  | Fiber diameter range of 99% of the total number of fibers (μm) | | | 2.0 to 9.0 | 2.2 to 9.4 | 2.0 to 9.2 | 2.4 to 9.2 | 1.7 to 8.8 | 2.2 to 9.8 |
|  | Recovered amount (mass %) | Flow rate: 0.50 (l/min) | | 8.2 | 8.6 | 8.2 | 8.6 | 8.2 | 8.0 |
|  |  | Flow rate: 1.38 (l/min) | | 0.58 | 0.61 | 0.64 | 0.64 | 0.75 | 0.60 |
|  |  | Flow rate: 5.54 (l/min) | | 0.01 | 0.01 | 0.01 | 0.01 | 0.01 | 0.01 |
|  | Bulk specific gravity in water | | | 0.0145 | 0.0150 | 0.0180 | 0.0150 | 0.0185 | 0.0190 |
| Holding material | Repulsive force (kPa) | A | G.B.D = 0.15 ($g/cm^3$) | 46 | 46 | 42 | 40 | 42 | 38 |
|  |  |  | G.B.D = 0.30 ($g/cm^3$) | 360 | 365 | 345 | 330 | 355 | 320 |
|  |  |  | G.B.D = 0.45 ($g/cm^3$) | 900 | 890 | 890 | 880 | 875 | 860 |
|  |  | B | G.B.D = 0.15 ($g/cm^3$) | 30 | 34 | 30 | 30 | 30 | 26 |
|  |  |  | G.B.D = 0.30 ($g/cm^3$) | 315 | 320 | 310 | 300 | 315 | 220 |
|  |  |  | G.B.D = 0.45 ($g/cm^3$) | 775 | 800 | 770 | 760 | 775 | 600 |
|  |  | C | G.B.D = 0.15 ($g/cm^3$) | 26 | 24 | 24 | 24 | 22 | 24 |
|  |  |  | G.B.D = 0.30 ($g/cm^3$) | 245 | 245 | 230 | 235 | 210 | 240 |
|  |  |  | G.B.D = 0.45 ($g/cm^3$) | 490 | 495 | 485 | 475 | 470 | 480 |
|  |  | D | G.B.D = 0.15 ($g/cm^3$) | 20 | 22 | 20 | 20 | 20 | 22 |
|  |  |  | G.B.D = 0.30 ($g/cm^3$) | 200 | 195 | 185 | 185 | 180 | 190 |
|  |  |  | G.B.D = 0.45 ($g/cm^3$) | 320 | 320 | 315 | 300 | 315 | 315 |

TABLE 6

|  |  |  |  | Comp. Ex. 14 | Comp. Ex. 15 | Comp. Ex. 16 | Comp. Ex. 17 | Comp. Ex. 18 | Comp. Ex. 19 |
|---|---|---|---|---|---|---|---|---|---|
| Production conditions | Transmittance of aluminum oxychloride (%) | | | | | 90 | | | |
|  | Transmittance of silica sol (%) | | | | | 90 | | | |
|  | Stock solution viscosity (mPa · s) | | | | | 5000 | | | |
|  | Pore diameter (mm) | | | | | 0.25 | | | |
|  | Circumferential speed of hollow disk (m/sec) | | | | | 50 | | | |
|  | Supply amount per one pore (ml/hr) | | | | | 15 | | | |
|  | Wind speed in furnace (m/sec) | | | 0 | 10 | 3 | 3 | 3 | 3 |
|  | Maximum temperature at furnace first half stage (° C.) | | | 900 | 900 | 700 | 1100 | 900 | 900 |
|  | Temperature-raising rate at furnace first half stage (° C./min) | | | 15 | 15 | 15 | 15 | 5 | 30 |
|  | Maximum temperature at furnace second half stage (° C.) | | | | | 1250 | | | |
|  | Temperature-raising rate at furnace second half stage (° C./min) | | | | | 25 | | | |
|  | Retention time at maximum temperature (min) | | | | | 20 | | | |
| Aggregate | Chemical composition | Alumina (mass %) | | 80 | Production suspended since the temperature did not reach 900° C. at continuous furnace first half stage | 80 | Production suspended due to insufficient furnace length at continuous furnace first half stage | Production suspended due to insufficient furnace length at continuous furnace first half stage | 80 |
|  |  | Silica (mass %) | | 20 |  | 20 |  |  | 20 |
|  | Mineral composition | Mullite (mass %) | | 30 |  | 30 |  |  | 30 |
|  | Specific surface area ($m^2/g$) | | | 14.3 |  | 39.6 |  |  | 62.3 |
|  | Average fiber diameter of inorganic short fibers (μm) | | | 3.1 |  | 3.0 |  |  | 3.1 |
|  | Fiber diameter range of 99% of the total number of fibers (μm) | | | 1.9 to 9.0 |  | 2.0 to 9.4 |  |  | 2.4 to 9.8 |
|  | Recovered amount (mass %) | Flow rate: 0.50 (l/min) | | 25.8 |  | 8.2 |  |  | 24.2 |
|  |  | Flow rate: 1.38 (l/min) | | 12.0 |  | 0.64 |  |  | 10.6 |
|  |  | Flow rate: 5.54 (l/min) | | 2.55 |  | 0.01 |  |  | 2.60 |
|  | Bulk specific gravity in water | | | 0.0335 |  | 0.0380 |  |  | 0.0390 |
| Holding material | Repulsive force (kPa) | A | G.B.D = 0.15 ($g/cm^3$) | 24 | — | 24 | — | — | 22 |
|  |  |  | G.B.D = 0.30 ($g/cm^3$) | 200 |  | 205 |  |  | 220 |
|  |  |  | G.B.D = 0.45 ($g/cm^3$) | 680 |  | 680 |  |  | 660 |
|  |  | B | G.B.D = 0.15 ($g/cm^3$) | 14 |  | 12 |  |  | 16 |
|  |  |  | G.B.D = 0.30 ($g/cm^3$) | 160 |  | 150 |  |  | 170 |
|  |  |  | G.B.D = 0.45 ($g/cm^3$) | 540 |  | 525 |  |  | 530 |

TABLE 6-continued

|   |   | Comp. Ex. 14 | Comp. Ex. 15 | Comp. Ex. 16 | Comp. Ex. 17 | Comp. Ex. 18 | Comp. Ex. 19 |
|---|---|---|---|---|---|---|---|
| C | G.B.D = 0.15 (g/cm3) | 12 |  | 14 |  |  | 8 |
|   | G.B.D = 0.30 (g/cm$^3$) | 55 |  | 60 |  |  | 60 |
|   | G.B.D = 0.45 (g/cm$^3$) | 110 |  | 115 |  |  | 120 |
| D | G.B.D = 0.15 (g/cm$^3$) | 8 |  | 10 |  |  | 4 |
|   | G.B.D = 0.30 (g/cm$^3$) | 25 |  | 30 |  |  | 20 |
|   | G.B.D = 0.45 (g/cm$^3$) | 60 |  | 70 |  |  | 50 |

Examples 19 to 24 and Comparative Examples 20 to 25

The operation was carried out in the same manner as in Example 1 except that an aluminum oxychloride aqueous solution having a transmittance of 90% and a silica sol having a transmittance of 90% were mixed so that the alumina would be 80 mass % and the silica would be 20 mass %, and as the firing conditions at the continuous furnace second half stage, the precursor fibers were heated to the maximum temperature of from 1,100° C. to 1,400° C. at from 10 to 40° C./min, and held at the maximum temperature for from 5 to 60 minutes. The results are shown in Tables 7 and 8.

TABLE 7

|   |   |   | Ex. 19 | Ex. 20 | Ex. 21 | Ex. 22 | Ex. 23 | Ex. 24 |
|---|---|---|---|---|---|---|---|---|
| Production conditions | Transmittance of aluminum oxychloride (%) |  |  |  | 90 |  |  |  |
|   | Transmittance of silica sol (%) |  |  |  | 90 |  |  |  |
|   | Stock solution viscosity(mPa·s) |  |  |  | 5000 |  |  |  |
|   | Pore diameter (mm) |  |  |  | 0.25 |  |  |  |
|   | Circumferential speed of hollow disk (m/sec) |  |  |  | 50 |  |  |  |
|   | Supply amount per one pore (ml/hr) |  |  |  | 15 |  |  |  |
|   | Wind speed in furnace (m/sec) |  |  |  | 3 |  |  |  |
|   | Maximum temperature at furnace first half stage (° C.) |  |  |  | 900 |  |  |  |
|   | Temperature-raising rate at furnace first half stage (° C./min) |  |  |  | 15 |  |  |  |
|   | Maximum temperature at furnace second half stage (° C.) |  | 1200 | 1300 | 1250 | 1250 | 1250 | 1250 |
|   | Temperature-raising rate at furnace second half stage (° C./min) |  | 25 | 25 | 20 | 30 | 25 | 25 |
|   | Retention time at maximum temperature (min) |  | 20 | 20 | 20 | 20 | 15 | 30 |
| Aggregate | Chemical composition | Alumina (mass %) | 80 | 80 | 80 | 80 | 80 | 80 |
|   |   | Silica (mass %) | 20 | 20 | 20 | 20 | 20 | 20 |
|   | Mineral composition | Mullite (mass %) | 15 | 60 | 30 | 30 | 30 | 30 |
|   | Specific surface area (m$^2$/g) |  | 5.8 | 2.4 | 3.0 | 3.2 | 3.0 | 3.8 |
|   | Average fiber diameter of inorganic short fibers (μm) |  | 3.1 | 3.2 | 3.0 | 3.1 | 3.1 | 3.2 |
|   | Fiber diameter range of 99% of the total number of fibers μm) |  | 2.0 to 9.0 | 2.2 to 9.4 | 2.2 to 9.2 | 2.4 to 9.0 | 1.7 to 8.8 | 2.2 to 9.8 |
|   | Recovered amount (mass %) | Flow rate: 0.50 (l/min) | 8.2 | 8.6 | 8.0 | 8.6 | 8.0 | 8.0 |
|   |   | Flow rate: 1.38 (l/min) | 0.58 | 0.61 | 0.64 | 0.66 | 0.70 | 0.60 |
|   |   | Flow rate: 5.54 (l/min) | 0.01 | 0.01 | 0.01 | 0.01 | 0.01 | 0.01 |
|   | Bulk specific gravity in water |  | 0.0135 | 0.0200 | 0.0155 | 0.0150 | 0.0155 | 0.0160 |
| Holding material | Repulsive force (kPa) | A  G.B.D = 0.15 (g/cm$^3$) | 50 | 40 | 42 | 40 | 40 | 38 |
|   |   | G.B.D = 0.30 (g/cm$^3$) | 400 | 355 | 340 | 330 | 355 | 320 |
|   |   | G.B.D = 0.45 (g/cm$^3$) | 920 | 870 | 890 | 885 | 870 | 860 |
|   |   | B  G.B.D = 0.15 (g/cm$^3$) | 30 | 32 | 30 | 30 | 30 | 26 |
|   |   | G.B.D = 0.30 (g/cm$^3$) | 315 | 310 | 315 | 310 | 315 | 220 |
|   |   | G.B.D = 0.45 (g/cm$^3$) | 785 | 795 | 775 | 760 | 775 | 605 |
|   |   | C  G.B.D = 0.15 (g/cm$^3$) | 30 | 24 | 24 | 24 | 22 | 24 |
|   |   | G.B.D = 0.30 (g/cm$^3$) | 275 | 240 | 235 | 240 | 210 | 240 |
|   |   | G.B.D = 0.45 (g/cm$^3$) | 520 | 475 | 485 | 475 | 475 | 480 |
|   |   | D  G.B.D = 0.15 (g/cm$^3$) | 20 | 22 | 20 | 20 | 20 | 22 |
|   |   | G.B.D = 0.30 (g/cm$^3$) | 195 | 205 | 190 | 185 | 180 | 190 |
|   |   | G.B.D = 0.45 (g/cm$^3$) | 310 | 325 | 315 | 300 | 315 | 310 |

TABLE 8

|  |  | Comp. Ex. 20 | Comp. Ex. 21 | Comp. Ex. 22 | Comp. Ex. 23 | Comp. Ex. 24 | Comp. Ex. 25 |
|---|---|---|---|---|---|---|---|
| Production conditions | Transmittance of aluminum oxychloride (%) | | | 90 | | | |
| | Transmittance of silica sol (%) | | | 90 | | | |
| | Stock solution viscosity (mPa · s) | | | 5000 | | | |
| | Pore diameter (mm) | | | 0.25 | | | |
| | Circumferential speed of hollow disk (m/sec) | | | 50 | | | |
| | Supply amount per one pore (ml/hr) | | | 15 | | | |
| | Wind speed in furnace (m/sec) | | | 3 | | | |
| | Maximum temperature at furnace first half stage (° C.) | | | 900 | | | |
| | Temperature-raising rate at furnace first half stage (° C./min) | | | 15 | | | |
| | Maximum temperature at furnace second half stage (° C.) | 1100 | 1400 | 1250 | 1250 | 1250 | 1250 |
| | Temperature-raising rate at furnace second half stage (° C./min) | 25 | 25 | 10 | 40 | 25 | 25 |
| | Retention time at maximum temperature (min) | 20 | 20 | 20 | 20 | 5 | 60 |
| Aggregate | Chemical composition Alumina (mass %) | 80 | 80 | Production suspended due to insufficient furnace length at continuous furnace second half stage | Not measured since dispersion of mullite crystallinity was remarkable in aggregate thickness direction | Not measured since dispersion of mullite crystallinity was remarkable in aggregate thickness direction | Production suspended due to insufficient furnace length at continuous furnace second half stage |
| | Silica (mass %) | 20 | 20 | | | | |
| | Mineral composition Mullite (mass %) | 0 | 70 | | | | |
| | Specific surface area (m²/g) | 54.3 | 2.4 | | | | |
| | Average fiber diameter of inorganic short fibers (μm) | 3.1 | 3.0 | | | | |
| | Fiber diameter range of 99% of the total number of fibers (μm) | 1.9 to 9.0 | 1.8 to 9.2 | | | | |
| | Recovered amount (mass %) Flow rate: 0.50 (l/min) | 7.8 | 7.8 | | | | |
| | Flow rate: 1.38 (l/min) | 0.50 | 0.50 | | | | |
| | Flow rate: 5.54 (l/min) | 0.01 | 0.01 | | | | |
| | Bulk specific gravity in water | 0.0110 | 0.0375 | | | | |
| Holding material | Repulsive force (kPa) A G.B.D = 0.15 (g/cm³) | 60 | 22 | — | — | — | — |
| | G.B.D = 0.30 (g/cm³) | 435 | 200 | | | | |
| | G.B.D = 0.45 (g/cm³) | 970 | 685 | | | | |
| | B G.B.D = 0.15 (g/cm³) | 22 | 16 | | | | |
| | G.B.D = 0.30 (g/cm³) | 260 | 185 | | | | |
| | G.B.D = 0.45 (g/cm³) | 540 | 560 | | | | |
| | C G.B.D = 0.15 (g/cm³) | 10 | 12 | | | | |
| | G.B.D = 0.30 (g/cm³) | 50 | 50 | | | | |
| | G.B.D = 0.45 (g/cm³) | 110 | 100 | | | | |
| | D G.B.D = 0.15 (g/cm³) | 8 | 6 | | | | |
| | G.B.D = 0.30 (g/cm³) | 20 | 22 | | | | |
| | G.B.D = 0.45 (g/cm³) | 60 | 54 | | | | |

It is found from the above Tables 1 to 8 that the aggregates of Examples of the present invention and the holding materials produced by employing them are excellent also in the resistance to wind erosion due to an exhaust gas as compared with Comparative Examples. Further, it is found that the effect of suppressing the decrease in the repulsive force is great (fiber deterioration is small) not only after being held under compression at room temperature for 20 hours but also after being held under compression under heating at 1,000° C. for 20 hours. Further, when the estimated repulsive forces after being held under compression under heating at 1,000° C. for 10 years are compared, in Comparative Examples, due to fiber deterioration, the holding materials have substantially no repulsive force (they can not hold a honeycomb with a sufficient repulsive force, and an exhaust gas may leak at that area), whereas the holding materials of the present invention have a high effect of suppressing the decrease in the repulsive force.

INDUSTRIAL APPLICABILITY

According to the present invention, an aggregate with small fiber deterioration even after being held under compression under heating at about 1,000° C. for a long term, and a holding material of a catalyst carrier of a catalyst converter, a holding material of a honeycomb of DPF and the like employing it are provided. Further, according to the process for producing an aggregate of the present invention, an aggregate having the above characteristics can readily be produced.

The invention claimed is:

1. An inorganic short fiber aggregate for a holding material, which is an aggregate of inorganic short fibers, characterized in that the specific surface area is at most 10 m²/g, at least 99% (including 100%) of the number of the inorganic short fibers consists of inorganic short fibers having fiber diameters of from 1.5 to 15 μm, and the inorganic short fibers have a chemical composition of from 74 to 86 mass % of an alumina component and from 26 to 14 mass % of a silica component and a mineral composition of from 15 to 60 mass % of mullite, and have an average fiber diameter of from 2 to 8 μm.

2. The inorganic short fiber aggregate for a holding material according to claim 1, wherein when 50 g of the aggregate is put in a stainless steel cylindrical container having a diameter of 80 mm and a depth of 150 mm, a pressure is applied thereto from the upper side, the pressure is released when it reaches 20 MPa, and elutriation classification of the crushed inorganic short fiber aggregate is carried out, the recovered solid material such as fibers is at most 10 mass % when the flow rate of water is 0.50 l/min, at most 5 mass % when the flow rate is 1.38 l/min, and at most 1 mass % when the flow rate is 5.54 l/min.

3. The inorganic short fiber aggregate for a holding material according to claim 1 or 2, wherein the bulk specific gravity in water as an index of the fiber strength is from 0.012 to 0.025, as obtained from the sediment volume obtained in such a manner that 5 g of the aggregate is stirred in 400 ml of water at 1,000 rpm for 10 minutes and then put in a measuring cylinder of 500 ml, water is added so that the total volume becomes 500 ml, and the liquid is left to stand for 30 minutes.

4. A process for producing the inorganic short fiber aggregate for a holding material as defined in claim 1, 2 or 3, which comprises mixing an aluminum oxychloride aqueous solution having a transmittance of at least 80%, a silica sol having a transmittance of at least 75% and a spinning aid to prepare a spinning stock solution having an alumina/silica mass ratio of from 74 to 86%/26 to 14% (total amount of both: 100%) and a viscosity of from 1,000 to 8,000 mPa·s, supplying the spinning stock solution to a hollow disk having a plurality of pores having a diameter of from 0.10 to 30 mm formed on the circumferential surface and discharging the spinning stock solution from the hollow disk, at from 8 to 20 ml/hr per one pore, while rotating the hollow disk at a circumferential speed of from 30 to 80 m/sec, to form the spinning stock solution into fibers, followed by drying, aggregation and firing.

5. The process for producing the inorganic short fiber aggregate for a holding material according to claim 4, wherein the firing is carried out by using a continuous furnace in such a manner that at the first half stage, the fibers are heated from room temperature to 800 to 1,000° C. at from 10 to 20° C./min at a wind speed in the furnace of from 1 to 5 m/sec, and subsequently at the second half stage of the continuous furnace, the fibers are heated to the maximum temperature of from 1,200 to 1,300° C. at from 20 to 30° C./min and held at the maximum temperature for from 15 to 30 minutes.

6. A holding material consisting of a sheet-shape formed product comprising the inorganic short fiber aggregate for a holding material as defined in claim 1, 2 or 3, and an organic binder contained in the gap of the aggregate.

7. The holding material according to claim 6, which is a holding material for fixing a catalyst carrier of an automotive exhaust gas clarifying catalyst converter, or a holding material for fixing a honeycomb body for a diesel particulate filter.

* * * * *